March 31, 1942.  E. R. JACOBI  2,278,200
RIM
Filed May 8, 1939  2 Sheets-Sheet 1
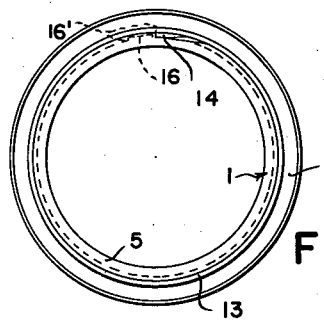
FIG.1.
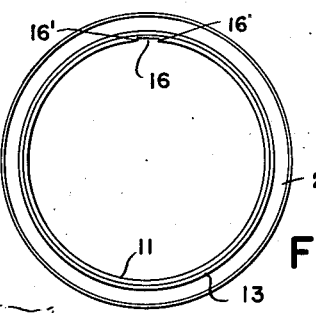
FIG.2.
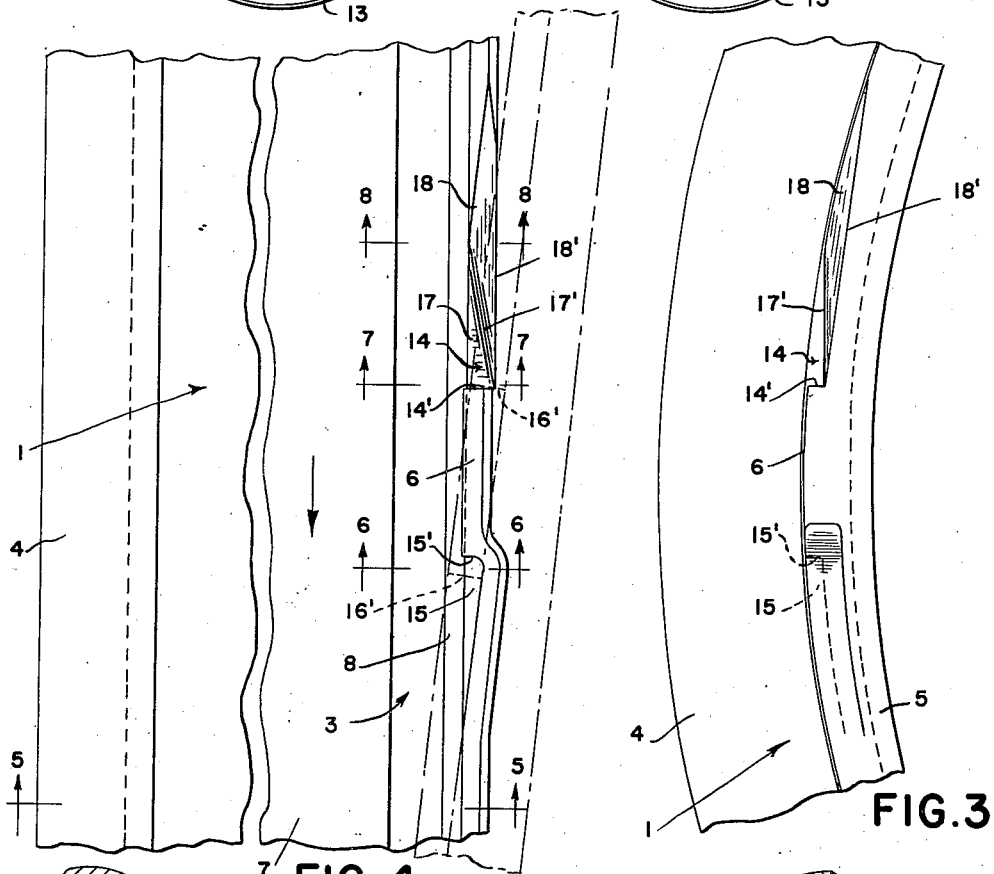
FIG.3.
FIG.4.
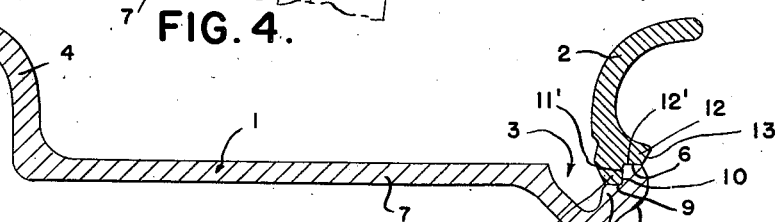
FIG.5.
INVENTOR.
EMIL R. JACOBI
BY
ATTORNEYS March 31, 1942.     E. R. JACOBI     2,278,200

RIM

Filed May 8, 1939     2 Sheets-Sheet 2

INVENTOR.
EMIL R. JACOBI
BY
ATTORNEYS

Patented Mar. 31, 1942

2,278,200

UNITED STATES PATENT OFFICE 2,278,200

RIM

Emil R. Jacobi, Detroit, Mich., assignor to Kelsey-Hayes Wheel Company, Detroit, Mich., a corporation of Delaware Application May 8, 1939, Serial No. 272,529

15 Claims. (Cl. 152—411)

The invention relates to rims and refers more particularly to vehicle wheel rims of that type having a rim base and a detachable tire retaining flange.

The invention has for one of its objects to provide an improved construction of rim in which the rim base and the tire retaining flange are endless and assembly or removal of the flange with or from the base may be readily accomplished and liability of accidental disengagement of the flange from the base is practically eliminated.

The invention has for other objects to so construct the rim that the flange is held from moving peripherally of the base in at least one direction during the preliminary assembly of the flange with the base; to so construct the rim that the flange may be completely assembled with the base by moving successive peripheral portions of the flange into place on the base; and to so construct the rim that the flange may be readily assembled with or removed from the base without providing either with a special tool receiving opening.

The invention has for a further object to so construct the rim with a gutter for receiving the flange and having the above mentioned features.

These and other objects of the invention will become apparent from the following description and claims, taken in connection with the accompanying drawings, in which Figure 1 is a side elevation of a rim embodying my invention;

Figure 2 is a side elevation of the tire retaining flange;

Figure 3 is an enlarged view of a portion of Figure 1;

Figure 4 is an enlarged plan view of a portion of the rim base;

Figure 10:
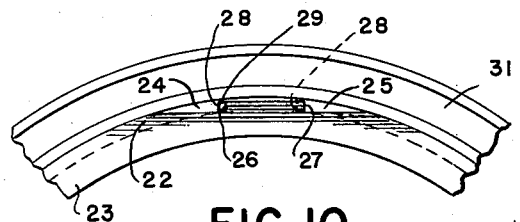
Figure 6:
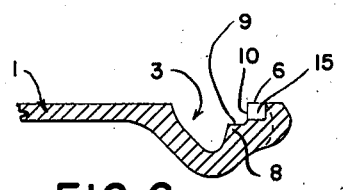
Figure 11:
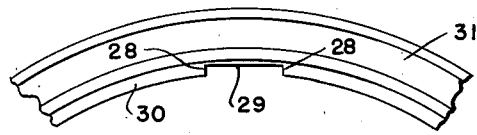
Figure 7:
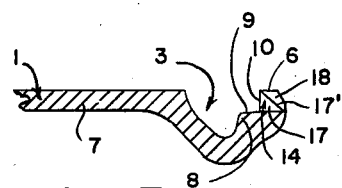
Figure 12:
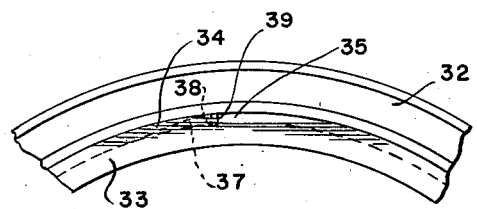
Figure 8:
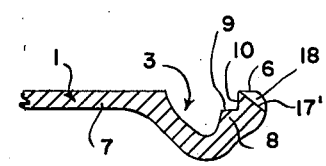
Figure 13:
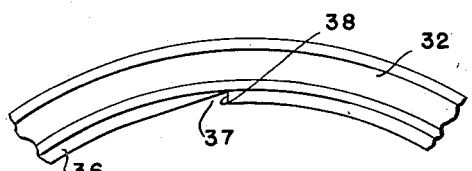
Figure 9:
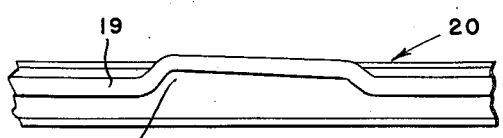

Figures 5, 6, 7 and 8 are cross sections on the lines 5—5, 6—6, 7—7 and 8—8 respectively of Figure 4;

Figure 9 is an enlarged inner plan view of a portion of a tire retaining flange showing another embodiment of my invention;

Figure 10 is an enlarged side elevation of a portion fo a rim showing another embodiment of my invention;

Figure 11 is a side elevation of a portion of the tire retaining flange;

Figure 12 is an enlarged side elevation of a portion of a rim showing another embodiment of my invention;

Figure 13 is a side elevation of a portion of the tire retaining flange.

As illustrated in Figures 1 to 8 inclusive, the rim comprises the endless rim base 1 and the detachable endless tire retaining flange 2. The rim base is provided at one edge with the gutter 3 and at the other edge with the tire retaining flange 4. As shown, this tire retaining flange is integral with the rim base. The outer wall 5 of the gutter has at its edge the face 6 which has an external diameter substantially equal to, but preferably slightly less than the external diameter of the cylindrical portion 7 of the rim base. The outer wall is preferably formed on its inner side with the enlargement 8 producing the annular shoulder 9 and with the radial face 10 extending from the shoulder 9 to the face 6. The shoulder is substantially midway between the bottom of the gutter 3 and the face 6, but preferably nearer the latter than the former.

The tire retaining flange 2 has an internal diameter less than the external diameter of the outer wall 5 of the gutter and slightly greater than the distance from the bottom of the gutter to the diametrically opposite part of the face 6 of the outer wall. The flange 2 has the base portion 11 provided with a radial outer face 11' adapted to engage the inner face 10 when the flange is assembled with the rim base, the base portion and the outer wall of the gutter forming cooperating means for retaining the flange on the rim base. The flange also has the lateral portion 12 provided with an annular face 12' adapted to engage and seat on the face 6 of the outer wall when the flange is assembled on the rim base. The lateral portion has at its edge the outer face 13 which is inclined radially outwardly and forwardly and which is adapted to engage the corner at the junction of the faces 6 and 10 of the outer wall to automatically center the tire retaining flange on the rim base when the former is forced forwardly or in an outboard direction by the tire while being inflated.

To provide for assembly of the tire retaining flange wtih the rim base, the outer wall 5 of the gutter is provided with the peripherally extending notch 14 in its periphery and with the adjacent peripherally extending axial recess 15 at its inner side. The notch 14 forms a radial relief and the recess 15 forms an axial relief. The base portion 11 of the tire retaining flange is also formed with the notch 16 forming a radial relief and having a peripheral extent slightly greater than that of the part of the outer wall between the notch 14 and the recess 15 so that during initial assembly of the tire retaining flange with the rim base the substantially radial ends 16' of the notch 16 are at opposite sides of the adjacent substantially radial ends 14' and 15' of the notch 14 and the recess 15 respectively. The ends 14' and 15' are parallel to each other, as are also the ends 16'. By reason of the axial recess 15, the tire retaining flange may be initially assembled with the rim base with a relatively small angle between the flange and the outer wall of the gutter, as shown in dotted lines in Figure 4. Also the peripheral extents of the notches 14 and 16 may be relatively short to provide the maximum strength of rim base and flange with minimum weight.

When the tire retaining flange is initially assembled with the rim base the notch 16 of the flange registers with the part of the outer wall 5 of the gutter between the notch 14 and the recess 15 and the part of the base portion 11 of the flange at one side of the notch 16 extends through the notch 14, and the part of the base portion at the other side of the notch 16 is located in the recess 15 and the part of the gutter 3 adjacent this recess. With reference to Figure 4, the parts, as initially assembled, are so arranged that peripheral movement of the flange relative to the rim base in the direction of the arrow, which would be in a counter-clockwise direction, as viewed in Figure 1, is limited by engagement of the right hand end or shoulder 16' of the notch 16 engaging the end or shoulder 14' of the notch 14. At the same time relative peripheral movement in the opposite direction is limited by the left hand end or shoulder 16' of the notch 16 being engageable with the end or shoulder 15' of the recess 15. As a result, peripheral movement of the tire retaining flange in either direction relative to the rim base is limited so that the flange is effectively positioned on the rim base during the initial assembly. With the parts initially assembled and with the right hand end or shoulder 16' engaging the end or shoulder 14', complete assembly may be readily carried out by progressively moving the base portion 11 over the outer wall 5 in the direction of the arrow in Figure 4, or in a counterclockwise direction, as viewed in Figure 1, during which time the flange is slightly sprung or distorted. During the final portion of the complete assembly, the base portion of the flange snaps completely into place in the gutter 3 and the notch 16 in the flange becomes completely hidden by reason of slight peripheral movement of the flange in the direction of the arrow in Figure 4 relative to the rim base. Therefore, there is no continuous opening through the outer wall of the gutter and the base portion of the flange to permit water, dirt, and the like, passing into the gutter.

The tire retaining flange may be readily detached or removed from the rim base preferably by inserting a tool, such as a screw driver, over the outer wall of the gutter into the notch 16 of the flange and then prying the portion of the flange in this zone over the outer wall, after which successive portions of the flange are pried over the outer wall until the flange can be readily removed. This operation is facilitated by reason of the internal diameter of the flange being slightly greater than the distance from the bottom of the gutter to the diametrically opposite part of the periphery of the outer wall. Another manner of disengaging the flange from the rim base is by inserting a tool, such as a screw driver, through the portion 17 of the notch 14 and beneath the base portion of the flange and then prying this portion over the outer wall. Then successive portions of the flange may be moved over the outer wall until the flange can be readily disengaged by hand.

For the purpose of increasing the strength of the rim base and, more particularly, the outer wall of the gutter, the notch 14 in the outer wall is formed to comprise the triangular shaped portion 17 extending axially completely through the outer wall and the triangular shaped recessed portion 18 at the outer side of the outer wall. The portion 17 has the substantially radial end 14' and the chordal edge 17'. The recessed portion is formed by beveling the part of the outer wall from the chordal edge 18' to the edge 17' and the part of the face 6 peripherally beyond the latter edge. The junction between the portions 17 and 18 is preferably rounded, especially in the larger sizes of rims. With this construction the outer wall of the gutter is of full height at its inner side to the reduced end of the portion 17 and is then of progressively decreasing height to the end 14'. At the same time, the recessed portion provides the necessary clearance to enable the initial assembly of the tire retaining flange with the rim base with a relatively small angle therebetween.

Figure 9 illustrates a modification of the tire retaining flange of Figures 1 to 8 inclusive. The base portion 19 of the tire retaining flange 20 of Figure 9, instead of being radially notched, as is the base portion of the tire retaining flange 2, is rearwardly offset to form the recess 21 which is adapted to register with and embrace the part of the outer wall of the gutter between its notch and axial recess. The ends or shoulders of the recess 21 are adapted to engage the adjacent ends or shoulders of the notch and recess of the outer wall to limit peripheral movement of the flange relative to the rim base in either direction. The manner of mounting or removing the flange is the same as that in mounting or removing the flange 2.

The modification of rim illustrated in Figures 10 and 11 differs from the rim illustrated in Figures 1 to 8 inclusive, mainly in notching the outer wall 22 of the gutter of the rim base 23 in peripherally spaced zones, instead of notching and axially recessing the same. More particularly, the outer wall 22 is notched at 24 and 25 in spaced zones to provide the adjacent substantially radial ends or shoulders 26 and 27 parallel to each other. These shoulders are adapted to be engaged by the shoulders formed by the ends 28 of the notch 29 in the base portion 30 of the tire retaining flange 31. The notches 24 and 25 may be formed in the same manner as the notch 14, but, as shown, they are formed with but one chordal edge. The flange is adapted to be mounted and removed in generally the same manner as the flange 2, but the operation of mounting is slightly more difficult because it is necessary to hold the base portion of the flange in the gutter at the end of the notch 25 until the base portion has been moved into the gutter in a zone spaced from the notch.

Figures 12 and 13 illustrate another embodiment of rim in which, during the initial assembly of the tire retaining flange 32 with the rim base 33, the former is held from peripheral movement relative to the latter in one direction only. In this construction the outer wall 34 of the gutter is provided with the notch 35 in its periphery which may be formed in the same manner as the notches 24 and 25 of Figures 10 and 11. The base portion 36 of the flange 32 is provided with the notch 37 preferably formed in the same manner as the notch 35. During initial assembly, the radial shoulder 38 at the end of the notch 37 is positioned against the radial shoulder 39 at the end of the notch 35 and the flange is held at a relatively small angle to the outer wall of the gutter with the part of its base portion at the notch 37 engaging the gutter. Assembly is completed by progressively moving the base portion of the flange over the outer side wall away from the notch 35 in a direction holding the shoulders 38 and 39 in engagement. To remove the flange from the rim base, a suitable tool, such as a screw driver, may be inserted into the notch in the flange to pry the adjacent portion of the flange over the outer side wall, after which successive portions of the flange may be pried over the wall until sufficient of the flange has been moved forwardly to completely remove the flange by hand.

What I claim as my invention is:

1. A wheel rim, comprising an endless rim base and an endless tire retaining flange having cooperating retaining portions, each retaining portion being provided with a notch and an end of one notch being engageable with an end of the other notch during assembly of the flange with the base to peripherally position the flange relative to the base, the notch of the retaining portion of the base being formed with a portion extending axially completely through the retaining portion and a recess at the outer side of the retaining portion extending peripherally beyond the first mentioned portion.

2. A wheel rim, comprising an endless rim base provided with a gutter, a detachable endless tire retaining flange having an internal diameter less than the external diameter of the outer wall of the gutter, the outer wall being provided with a notch in its periphery and the flange being provided with a notch in its base portion, the notch in the outer wall being formed with a triangular shaped portion extending axially completely through the outer wall and a triangular shaped recessed portion at the outer side of the outer wall overlapping and extending peripherally beyond the first mentioned portion and having a surface inclined radially outwardly and toward the inner side of the outer wall.

3. A wheel rim, comprising an endless rim base and an endless tire retaining flange having cooperating retaining portions, the retaining portion of the base being provided with a notch and a peripherally spaced axial recess and the retaining portion of the flange being provided with a notch adapted to embrace the part of the retaining portion of the base between its notch and axial recess during assembly of the flange with the base, the notch of the retaining portion of the base being formed with a portion extending axially completely through the retaining portion, and a recess at the outer side of the retaining portion extending peripherally beyond the first mentioned portion.

4. A wheel rim, comprising an endless rim base provided with a gutter having an outer wall and a detachable endless tire retaining flange having an internal diameter less than the external diameter of said outer wall and extending into said gutter, said outer wall being provided with spaced peripherally extending reliefs occupying a minor part of the circumference of said outer wall and said flange being provided with a peripherally extending relief opposite the space between said reliefs in said outer wall, said reliefs being of sufficient depth and extent to provide for placing the parts of said flange adjacent to the relief therein on the inboard and outboard sides of said outer wall and also to provide for placing the relief of said flange to embrace the part of the outer wall between the reliefs therein, whereby the outboard part of said flange may be forced progressively from adjacent the inboard part of said flange over said outer wall into said gutter and said flange is held from peripheral movement relative to said outer wall.

5. A wheel rim, comprising an endless rim base and an endless tire retaining flange having cooperating radially overlapping retaining portions, one retaining portion being provided with spaced peripherally extending reliefs occupying a minor part of the circumference of said retaining portion and the other retaining portion being provided with a peripherally extending relief opposite the space between said first mentioned reliefs, said reliefs being of sufficient depth and extent to provide for placing the parts of the retaining portion of said flange adjacent to the relief therein on the inboard and outboard sides of the retaining portion of said rim base and also to provide for placing the relief of said first mentioned retaining portion to embrace the part of said second mentioned retaining portion between the reliefs therein whereby the outboard part of the retaining portion of said flange may be forced progressively from adjacent the inboard part of the retaining portion of said flange over the retaining portion on said rim base and said flange is held from peripheral movement relative to said rim base.

6. A wheel rim, comprising an endless rim base provided with a gutter having an outer wall and a detachable endless tire retaining flange provided with a base portion having an internal diameter less than the external diameter of said outer wall and located at the inboard side thereof, said outer wall being provided with a notch in its periphery and an adjacent axial recess in its inner side, the two together occupying a minor part of the circumference of said outer wall, and said base portion being formed with a notch opposite the space between said notch and recess in said outer wall, said notches being of sufficient depth and extent to provide for placing the parts of said base portion adjacent to the notch therein on the inboard and outboard sides of said outer wall and also to provide for placing the notch of said base portion to embrace the part of said outer wall between the notch and recess therein whereby the outboard part of said base portion may be forced progressively from adjacent the inboard part of said base portion over said outer wall to the inboard side thereof and said base portion is held from peripheral movement relative to said outer wall.

7. A wheel rim of that type having an endless rim base and a detachable endless tire retaining flange adapted to be assembled with and releasably secured to said rim base by an axial movement of peripherally successive portions of said flange over said rim base, characterized by said rim base and flange each having cooperating generally radial retaining portions with each retaining portion formed with a notch to facilitate assembly of said flange with said rim base, a part of the retaining portion of said flange adjacent its notch being engageable in the notch of the retaining portion of said rim base and an end of one notch being engageable with an end of another notch to limit movement of said flange in one direction peripherally of said rim base during assembly of said flange with said rim base, said notches being of sufficient depth and extent to provide for axial movement of peripherally successive portions of said retaining portion of said flange over said retaining portion of said rim base while said retaining portion of said flange is engageable in the notch in said retaining portion of said rim base.

8. A wheel rim comprising an endless rim base and an endless tire retaining flange capable of being removably secured to said rim base, said rim base being provided along one edge with an annular gutter and a generally radial wall forming a portion of said gutter, an annular seat on said wall and a complementary seat on said flange, the inner diameter of said flange being less than the outer diameter of said wall and greater than the distance from the bottom of said gutter to the outer periphery of said seat on said wall at a diametrically opposite point, said wall and flange each being provided with a notch and with a portion adjacent its notch engageable in the notch of said flange and wall respectively, said notches being of sufficient depth and extent to provide for removably securing said flange on said rim base by an axial movement of the outboard part of said flange progressively in one direction from its notch over said wall.

9. A wheel rim comprising an endless tire seating rim base having a generally radially outwardly extending wall and an endless tire retaining flange normally seated upon said wall and having a generally radially inwardly extending base portion engaging the inboard side of said wall to normally prevent removal of said flange from said rim base, said wall and base portion each being formed with a notch, with the notches of sufficient depth and extent to provide for placing said base portion over said wall with the notches extending substantially end to end and with the parts of said base portion adjacent to the notch therein on the inboard and outboard sides of said wall whereby the outboard part of said base portion may be forced progressively from adjacent the inboard part of said base portion over said wall to the inboard side thereof.

10. A wheel rim, comprising an endless tire seating rim base having a generally radially outwardly extending wall and an endless tire retaining flange normally seated upon said wall and having a generally radially inwardly extending base portion engaging the inboard side of said wall to normally prevent removal of said flange from said rim base, said wall and base portion each being formed with a relieved part including a notch, the notches being of sufficient depth and extent to provide for placing said base portion over said wall with the notches extending substantially end to end and with the parts of said base portion adjacent to the relieved part thereof on the inboard and outboard sides of said wall whereby the outboard part of said base portion may be forced progressively from adjacent the inboard part of said base portion over said wall to the inboard side thereof.

11. A wheel rim, comprising an endless rim base and an endless tire retaining flange having radially overlapping retaining portions, each retaining portion being formed with a relieved part including a notch, the notches being of sufficient depth and extent to provide for placing the retaining portion of said flange over the retaining portion of said rim base with the notches extending substantially end to end and with the parts of the retaining portion of said flange adjacent to the relieved part thereof on the inboard and outboard sides of the retaining portion of said rim base whereby the outboard part of the retaining portion of said flange may be forced progressively from adjacent the inboard part of the retaining portion of said flange over the retaining portion of said rim base to the inboard side of said last mentioned retaining portion.

12. A wheel rim, comprising an endless rim base and an endless tire retaining flange having radially overlapping retaining portions, each retaining portion being provided with a relatively short notch, the notches being of sufficient depth and extent to provide for placing the retaining portion of said flange over the retaining portion of said rim base with the notches extending substantially end to end and with the parts of the retaining portion of said flange adjacent to the notch therein on the inboard and outboard sides of and radially overlapping the retaining portion of said rim base whereby the part of the retaining portion of said flange on the outboard side of the retaining portion of said rim base may be forced progressively from adjacent the inboard part of the retaining portion of said flange over the retaining portion of said rim base to the inboard side thereof.

13. A wheel rim, comprising an endless rim base and an endless tire retaining flange having cooperating radially overlapping retaining portions, each retaining portion being provided with a single notch only, the notches being of sufficient depth and extent to receive parts of the retaining portions adjacent ends of the notches with the notches extending substantially end to end and to provide for placing the parts of the retaining portion of said flange adjacent to the notch therein on the inboard and outboard sides of and radially overlapping the retaining portion of said rim base whereby the part of the retaining portion of said flange on the outboard side of the retaining portion of said rim base may be forced progressively from adjacent the inboard part of the retaining portion of said flange over the retaining portion of said rim base to the inboard side thereof.

14. A wheel rim, comprising an endless rim base having a gutter at one edge thereof provided with an outer wall, and an endless tire retaining flange having an internal diameter less than the external diameter of said outer wall and extending into said gutter, said rim base and flange being provided with means providing for assembly of said flange with said rim base comprising a single notch formed in said outer wall and a single notch formed in said flange, the notches being of sufficient depth and extent to provide for placing said flange over said outer wall with the notches extending substantially end to end and with the parts of said flange adjacent to the notch therein on the inboard and outboard sides of said outer wall whereby the outboard part of said flange may be forced progressively from adjacent the inboard part of said flange over said outer wall into said gutter.

15. A wheel rim, comprising an endless rim base having a generally radial wall element at one side thereof and an endless tire retaining flange having a generally radial base element with an internal diameter less than the external diameter of said wall element and located at the inboard side thereof, said rim base and flange being provided with means providing for assembly of said flange with said rim base comprising a notch formed in one of said elements and a single notch formed in the other of said elements, the notches being of sufficient depth and extent to provide for placing said base element over said wall element with the notches extending substantially end to end and with the parts of said base element adjacent the notch therein on the inboard and outboard sides of said wall element whereby the outboard part of said base element may be forced progressively from adjacent the inboard part of said base element over said wall element to the inboard side thereof.

EMIL R. JACOBI.